3,580,843
CHROMATOGRAPHIC MEDIUM AND METHOD
Ival O. Salyer, Dayton, Robert T. Jefferson, West Carrollton, and William D. Ross, Eaton, Ohio, assignors to Monsanto Research Corporation, St. Louis, Mo.
Filed July 27, 1970, Ser. No. 58,382
Int. Cl. B01d 15/08
U.S. Cl. 210—31
13 Claims

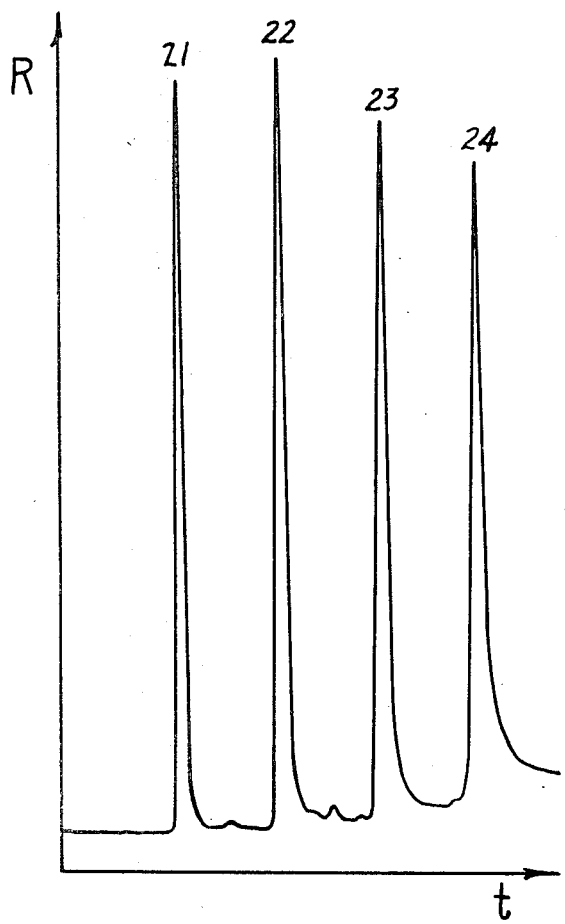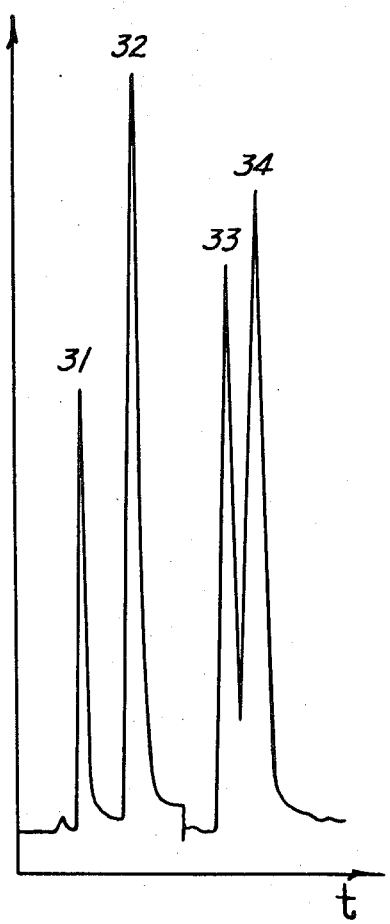

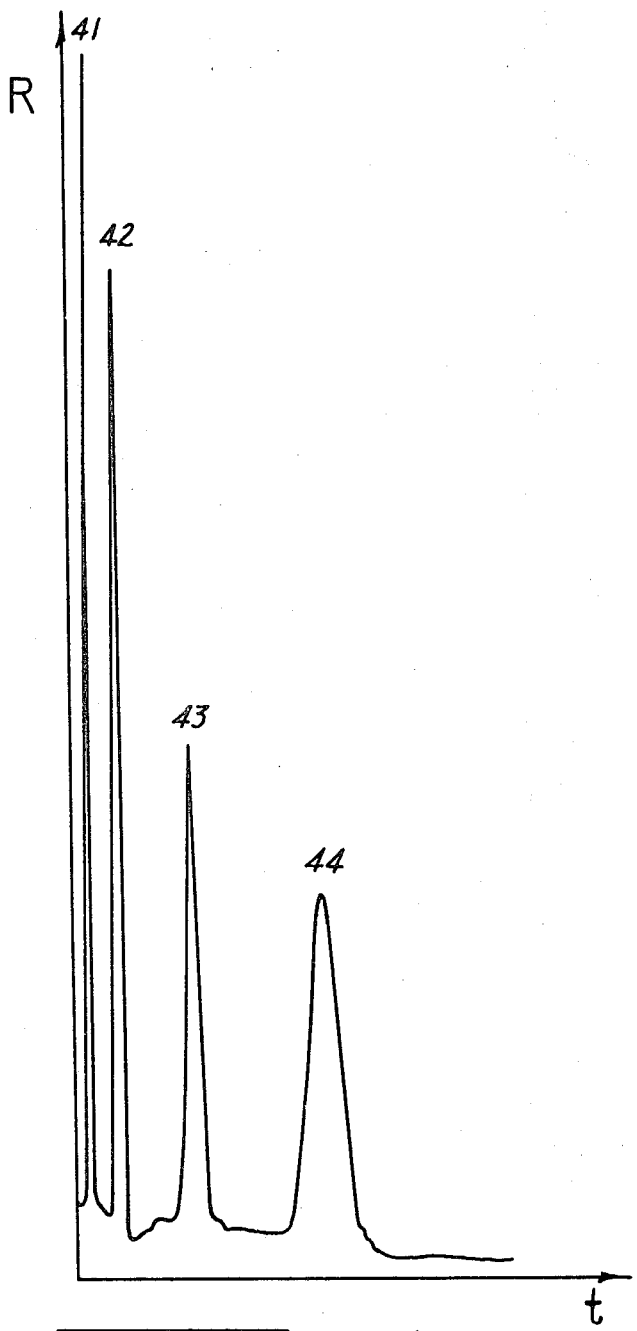

ABSTRACT OF THE DISCLOSURE

An improvement in a chromatographic column in which the chromatographic medium or support is an open-pore polyurethane structure filling the column wall-to-wall; the process for filling the column with a homogeneous precursor solution; and the process for using the column to separate organic compounds such as hydrocarbons and metal derivatives of diketones.

CROSS-REFERENCE

This invention relates to a use of an open-pore polyurethane structure previously disclosed in copending application Ser. No. 828,647 filed May 28, 1969.

BACKGROUND OF THE INVENTION

This invention relates to a chromatographic medium and a method of separating organic compounds. It further relates to a formed-in-place wall-to-wall porous polyurethane support for a chromatographic column.

Previously, chromatographic columns utilizing particles of porous foam rubber have been disclosed by V. Pretorius and H. Hahn in French Pat. 1,506,648, Dec. 22, 1967 (Chem. Abs. 70, 64077h (1969)). Porous polyaromatic polymer beads synthesized from styrene with divinylbenzene as crosslinker have been used to separate gaseous mixtures by O. L. Hollis, Anal. Chem. 38, 309 (1966). Porous polyethylene was used for gas chromatography by E. H. Baum, J. Gas Chrom. 1, 13 (Nov. 1963). Foamed polyurethane was disclosed as a packing material for a column by J. J. Van Venrooy in U.S. Pat. 3,347,020, issued Oct. 17, 1967. Cellular layers including polyurethanes were disclosed for inducing lateral flow and localized mixing of streams moving through a chromatographic column, by R. P. Crowley in U.S. Pat. 3,422,605, Jan. 21, 1969.

Chromatography is a well-known method of separating and analyzing mixtures of chemical substances (see "Chromatography," McGraw-Hill Encyclopedia of Science and Technology, McGraw-Hill Book Co., Inc., New York, Vol. 3, page 91). It may be used for analytical purposes or, with somewhat larger equipment, for preparatory purposes. The chromatographic medium, usually a sorbent, is often confined in a column through which the mixture passes in a fluid state, either as a gas, liquid or a solution. The medium may also be in the form of a sheet or strip, or a layer on a supporting plate. The medium itself may serve as a separatory material or stationary phase, sorbing the chemical substances in varying degrees, so that they are subsequently released separately by elution; or the medium may act as a support i.e. a substrate, for a liquid stationary phase that acts as a sorbent. Gas-liquid and liquid-liquid systems are common. If the chemical mixture is volatilized, as by heat, the vapors equilibrate with the sorbent; if the mixture is a liquid or is dissolved in an inert solvent, the partition process occurs in a liquid-liquid system. Although the mechanism by which polyurethane acts as a separatory material in the present fluid-solid system is not clear, its partition properties suggest an extended liquid surface.

SUMMARY OF THE INVENTION

An object of the invention is to provide a chromatographic medium capable of being formed in place as wall-to-wall packing. A further object is to provide a porous wall-to-wall chromatographic separatory packing capable of separating organic compounds. A further object is to provide a porous wall-to-wall chromatographic support for retaining known amounts of uniformly distributed liquid stationary phase. A further object is to provide a porous polymeric chromatographic medium having a broad temperature range of utility. A further object is to provide a chromatographic medium for thin layer chromatography. A further object is to provide an improved method for filling a chromatographic column. Still a further object is to provide a method for separating organic compounds in the gaseous, liquid or solution state.

These and other objects hereinafter defined are met by the invention wherein there is provided a method of preparing a chromatographic column with an open-pore polyurethane structure as a chromatographic medium comprising the steps of: (a) preparing separate solutions of polyurethane forming reactants in inert organic liquid diluents which are capable of forming a homogeneous mixture in which the polyurethane is substantially insoluble comprising (1) a solution of a first inert organic liquid diluent and a mixture of polyaryl polyalkylene polyisocpanates having a functionality of about 2.1–3.5 and containing about 40–50% diisocyanate, the balance being tri-, tetra-, and pentaisocyanates, said polyisocyanates having the formula

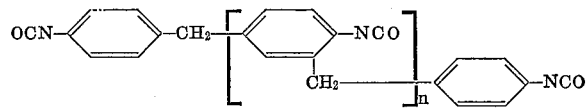

wherein $n$ has an average value of 0.5–2.0 and (2) a solution of a second inert organic liquid diluent and a polyol having a functionality of at least 3.0; (b) mixing solutions (1) and (2) and making a homogeneous liquid mixture of the reactants having a total concentration of weight of 10–30% and an NCO/OH ratio of 0.90–1.05 and ceasing said mixing before the onset of gelation; (c) transferring the homogeneous liquid mixture to the empty chromatographic column so as to fill it before the onset of gelation; (d) maintaining the contents of the column in a substantially quiescent state while gelation occurs and the open-pore polyurethane structure is formed; and (e) thereafter removing the inert organic liquid diluents.

By "functionality" of the polyisocyanate is meant the average number of NCO groups per molecule. The isocyanate groups are conveniently determined by the "amine equivalent" method (ASTM D–1638–67T). The hydroxyl groups of the polyol are determined by appropriate methods (ASTM D–1638–67T) and usually reported as "hydroxyl number," i.e., the number of milligrams of potassium hydroxide equivalent to the hydroxyl content of 1 gram of the sample. The NCO/OH ratio is the equivalent weight of isocyanate groups present in the polyisocyanate reactant divided by the equivalent weight of hydroxyl groups present in the polyol reactant.

By "homogeneous" is meant a mixture that is essentially uniform. This can be determined by sampling and analysis. In some instances it can be demonstrated by the absence of visible striations characteristic of poorly mixed liquids having different refractive indices. Still another test is incorporation of a dye or coloring matter in one solution and observation of the uniformity of dispersion on mixing with a second solution.

By "gelation" is meant the change of state from the original clear solution to a gel or jelly, usually opaque.

It is readily apparent as a visible phenomenon or may be detected by suitable viscosity measurements on segregated portions of the mixture, as with a Brookfield rotational viscometer, whereby a sharply rising viscosity indicates the onset of gelation.

Unlike the prior art products, the open-pore polyurethane structures comprise agglomerated coherent spherical particles rather than interconnected struts left from blown dodecahedral cells as in foam products. These structures are remarkably uniform and have a high degree of porosity and can be obtained in a density varying from 0.1 to 0.5 gram per cubic centimeter. They may be made in a variety of pore sizes, usually less than 10 microns. The fine pore structure is considerably smaller than the finest foam cells known in the art, and consequently offers advantages over the foams in capillarity, as for example the wicking up of organic liquids.

The crosslinked polyurethane structure obtained from the polyfunctional reactants are remarkably solvent- and heat-resistant as compared with known thermoplastic structures. Thus, they can be subjected to carbon tetrachloride, benzene, toluene, xylene, etc. without swelling or degradation and can be heated to 300° C. without deleterious effect on their sorption properties.

The present process for filling a chromatographic column offers several advantages over prior art processes. First, it provides a chromatographic medium or support that readily fills the column wall-to-wall and adheres tightly to the walls. This results in superior performance over packed columns using particulate fillers, in that uniform density is obtained and channeling is prevented along the support/wall interface. That channeling has been a problem is shown by prior art efforts to use baffles or porous layers to break up the gas flow. Secondly, it provides a medium of controllable density, porosity, and surface characteristics which can be optimized for a specific application. Its properties of chemical inertness and thermal stability are superior to those of prior art materials, and it may, therefore, be exposed to a wider variety of solvents and may be used at higher temperatures than previously known chromatographic media. Thirdly, the process is applicable to columns of various shapes and sizes, even though complex or even though small in cross-section, e.g. <1 mm. in diameter as in capillary tubes. No other prior art process has used a low viscosity liquid precursor to fill a column. Furthermore, columns of large cross-section (i.e. greater than 1 inch in diameter) can be filled as readily as small ones, because the exothermic character of the polyurethane reaction is held within check by the present process, in contrast to prior art methods for polyurethane foams that have difficulty in disposing of heat. Fourthly, liquid stationary phases may be incorporated in the medium by addition to the precursor solutions to obtain uniform distribution and high concentration, superior to those obtained by the percolation process of the prior art.

BRIEF DESCRIPTION OF THE DRAWINGS

Some of the novel features of the present invention will become apparent from the following description which is to be considered in connection with the accompanying drawings.

FIG. 2 represents a chromatogram showing the separation of $C_6$–$C_9$ normal aliphatic hydrocarbons, wherein 21, 22, 23, and 24 represent hexane, heptane, octane and nonane, respectively;

FIG. 3 represents a chromatogram showing the separation of aliphatic and aromatic hydrocarbons, wherein 31, 32, 33, and 34 represent hexane, benzene, toluene and xylene, respectively; and FIG. 4 represents a chromatogram showing the separation of metal derivatives of diketones, wherein 41, 42, 42, and 44 represent the trifluoroacetylacetonates of beryllium, aluminum, chromium (III) and rhodium (III), respectively.

DESCRIPTION OF THE PREFERRED EMBODIMENTS

Figure 1:
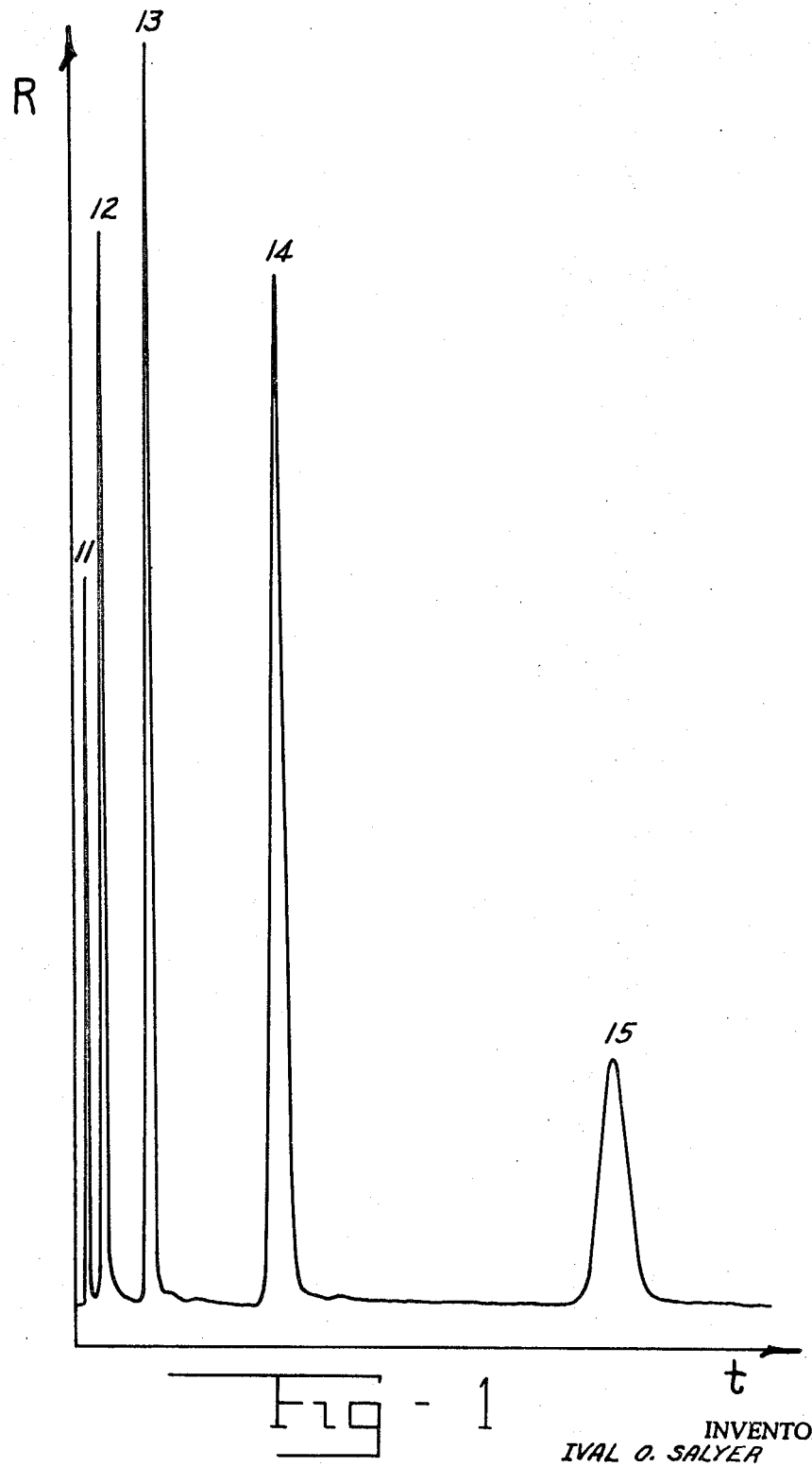
FIG. 1 represents a chromatogram showing the separation of $C_5$–$C_9$ normal aliphatic hydrocarbons, wherein 11, 12, 13, 14 and 15 represent pentane, hexane, heptane, octane and nonane, respectively, R is the axis of ordinates showing detector response, and $t$ is the abscissa showing time.

The conditions for forming an open-pore polyurethane structure are set forth in the cited copending application Ser. No. 828,647 filed May 28, 1969, and are incorporated herewith by reference. These include the choice of organic liquid diluent or diluents, the polyisocyanates, and the polyols; factors such as the presence of catalysts, the concentration of reactants, the NCO/OH ratio of the system, and the temperature; the necessity for a homogeneous system prior to gelation; the necessity for absence of shearing during gelation; and the possibility of altering the structure by additives, fillers, surfactants, water or pneumatogens.

Preferred polyols are selected from the reaction product of ethylene diamine and propylene oxide having a molecular weight of 274–300 and a hydroxyl number of about 750–800, and the reaction product of diethylenetriamine and propylene oxide having a molecular weight of 400–600 and a hydroxyl number of about 450–800.

The homogeneous solutions of the urethane reactants prior to gelation, containing the urethane precursors, are readily transferred to a chromatographic column. Unlike solutions of conventional polymers, these solutions have low viscosity and flow readily even at high concentration of the reactants. They are therefore handled easily and are adaptable to unusual shapes and structures such as capillary tubes. The "solution time" prior to gelation is readily established by experimentation. Transfer is then made safely during the period without jeopardizing the properties of the polymer structure. Once gelation occurs the mixture must be kept in a quiescent state to insure optimum uniformity. If the column is a straight tube, it is readily filled and left standing in a vertical position until gelation is complete. We have found that columns that are more complex than straight tubes, e.g. U-tubes or coiled tubes, are preferably filled completely to exclude air bubbles and then rotated gently either manually or on a device so that the gelled polymer does not settle away from the wall by the action of gravitational forces. Thus, a U-tube may be fastened to a vertical "wheel" and rotated in the direction of its axis common to both arms of the U. A coiled column may be rotated back and forth through an arc of 30–90° manually, charging direction so as to move in three axes; or it may be held in a device such as the "Kemper Stereodrome" described in U.S. Pat. 3,104,423 issued Sept. 24, 1963 to Charles R. Kemper, which provides triaxial rotation. The time for the rotation is usually about twenty minutes, beginning when gelation is apparent from the clouding of the solution. The rotation is gentle enough so that no significant shearing effect is transmitted to the gelling mixture.

The removal of inert organic liquid diluents, e.g. toluene, carbon tetrachloride, and the like, may be done by sweeping the column with a carrier gas, such as helium, preferably while gently warming the column. Prior to this step, it may be desirable to flush the column at room temperature with additional organic liquid diluent. In this way, uncombined reactants and soluble low molecular weight polymers are removed. Their presence may adversely affect the sorption properties of the chromatographic column.

Although the present polyurethane chromatographic medium may be used as a separatory phase per se, its efficiency may be enhanced by a coating of a stationary liquid phase. For this purpose, any one of the many materials available on the market may be used. See catalog 1970 of Supelco, Inc., Supelco Park, Bellefonte, Pa. 16823, pages 3–8. Thus, there are the Apiezons, the Armeens, the Aroclors®, the Carbowaxes, the phthalates, the silicones, etc. Preferred for high temperature use are materials having low volatility, such as Dow-Corning's DC–550 having a maximum volatility of 3 percent after 4 hours at 250° C. The liquid phase material may be simply dissolved in a solvent and percolated through the filled column, after which the solvent is removed by heating and sweeping with a gas; or, preferably, because of the unique properties of the present process, the liquid phase material may be incorporated in the homogeneous liquid precursor solution and thereby become uniformly distributed at fixed concentration throughout the final product. Furthermore, rather high concentrations of the stationary liquid phase material, e.g. 75% by weight based on the polymer, may be so incorporated.

Additionally, filler materials, including other particulate chromatographic fillers, can be advantageously incorporated into the solutions prior to filling the columns. In this way the ease of filling, inherent in the low-viscosity liquid casting, the absence of channelling, chemical inertness, etc., of the urethane porous structure can be retained and the versatility and utility of the overall system increased. Particulate chromatographic fillers which have been incorporated into our porous urethane structure to illustrate this concept include a copolymer of ethylvinylbenzene and divinylbenzene identified as Porapak Q (Waters Associates, Framingham, Mass.).

The present process, therefore, provides chromatographic columns in which the chromatographic medium or support comprises an open-pore or porous polyurethane structure filling the column wall-to-wall rather than with individual noncoherent particles or even beads or lumps of polymers. The support may be coated with a liquid stationary phase, preferably a silicon oil having a maximum volatility of 3 percent after 4 hours at 250° C. It further provides large-diameter porous polymeric media that cannot be fabriacted by prior art foam methods.

The columns of this invention are useful in a method of separating organic compounds in the gaseous, liquid or solution state. They may be used with solvents that attack prior art chromatographic media, and may be used at higher temperatures than prior art porous polymers. They are admirably adapted to the separation of metal derivatives of diketones such as the fluorinated acetylacetonates of aluminum, beryllium, chromium, rhodium, and the like.

In addition to chromatographic columns, there are also provided thin-layer chromatographic plates prepared from these open-pore or porous polyurethane structures. They are useful in quick qualitative analyses of mixtures of chemical compounds.

The invention is further illustrated by, but not limited to, the following examples.

EXAMPLE 1

This example illustrates a metal column filled with open-pore polyurethane prepared from crude MDI having a functionality of about 2.6.

First, the urethane formulation was prepared as Solution A and B. Solution A consisted of 27.1 grams of an oxypropylated diethylenetriamine polyol having a molecular weight of about 590, a hydroxyl number of about 480 and hydroxyl functionality of about 5.0 (hereinafter referred to as "LA–475", commercially available from Union Carbide Corporation) in about 140 grams of toluene. Solution B consisted of about 140 grams of toluene containing 30.3 g. of polyisocyanate (a mixture of polyaryl polyalkylene polyisocyanates) obtained by phosgenating the reaction product of aniline with formaldehyde, said mixture of organic polyisocyanates having the formula

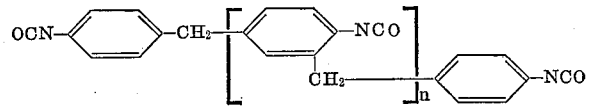

where $n$ has an average value of 0.5–2.0, containing about 40–50 percent diisocyanate, the balance being tri-tetra- and pentaisocyanates, hereinafter referred to as "crude MDI," i.e. crude p,p'-diphenylmethane dissocyanate in this instance having a functionality of about 2.6 and an equivalent weight of about 132–135.

Then the chromatographic column, consisting of aluminum tubing 30 ft. long x $\frac{1}{16}$ in. I.D., was prepared for filling. Solutions A and B were cooled to 17–20° C., combined, and the mixture was stirred briefly until it reached 21° C., and then drawn into the column. The column was completely filled to exclude any air bubbles, and was then clamped shut. The filled column was fastened to a vertical turn-table and revolved at about 5 r.p.m. during the gelation period (usually 5–30 min.) and for an additional hour thereafter. The filled column was left undisturbed for at least two hours and preferably sixteen hours while the gel hardened. Then the solvent was expelled with a stream of nitrogen gas at 1–3 p.s.i., leaving a porous polyurethane packing in the column.

A liquid phase was added to the polyurethane packing by forcing through it 10 ml. of a 20& solution of a silicone fluid (identified as DC 550 and described in the Dow Corning Bulletin 05–039, April 1963, "Silicone Notes," Dow Corning Corporation, Midland, Mich.) in benzene with nitrogen at 175 p.s.i.g. Thereafter the benzene was removed by purging with nitrogen.

The column was used in a Hewlett-Packard Model 402 gas chromatograph as described in the catalog of Hewlett Packard, Palo Alto, Calif., "1968 Instrumentation, Electronic, Analytical, Medical." A column temperature of 30–100° C. was used, A sample (1 microliter) of a mixture of $C_5$–$C_9$ normal aliphatic hydrocarbons was injected at an injection port temperature of 200° C. A flame ionization detector was used at 200° C. The resulting chromatogram showed symmetrical elution peaks with excellent resolution.

EXAMPLE 2

This example shows the use of a metal column having no liquid phase.

A metal column was filled as in Example 1 except that no silicone DC–550 solution was added. The column was used in a Hewlett Packard Model No. 700 gas chromatograph. A column temperature of 90° C. was used. A sample (0.2 μl) of a mixture of water and methanol was injected, at a helium flow rate of 60 ml./min. A thermal conductivity detector was used. The resulting chromatogram showed peaks with remarkably good symmetry for polar compounds.

EXAMPLE 3

This example illustrates a glass column having two sections, of which the first is filled with open-pore polyurethane prepared from crude MDI having a functionality of about 2.3, and the second with a polyurethane wherein the crude MDI has a functionality of about 2.6.

For the first section, the urethane formulation was prepared as follows: Solution A consisted of 27.1 grams of polyol LA–475 in about 140 grams of toluene; Solution B consisted of about 140 grams of toluene containing 30.3 grams of polyisocyanate (a crude MDI having a functionality of about 2.3 and an equivalent weight of about 132–135).

Then the first section of chromatographic column, consisting of glass tubing 10 inches in length x 0.25 in. O.D., was filled as in Example 1 and the solvent was removed by purging with nitrogen at room temperature.

The second section of column, also 10 inches x 0.25 in., was filled with a polyurethane formulation prepared as in Example 1. The two sections were then coupled together and the polyurethane packing was coated with DC–550 as a liquid phase of 30% by weight by slowly drawing a 10/ solution through the column.

The column was used in a Hewlett-Packard Model No. 402 gas chromatograph. A column temperature of 30–100° C. was used. A sample (0.5 μl.) of a mixture of $C_6$–$C_9$ normal aliphatic hydrocarbons was injected at a port temperature of 200° C. The resulting chromatogram showed good resolution of the separate elution peaks.

EXAMPLE 4

This example illustrates a glass column having no liquid phase.

A glass column, 4 ft. long x 5/32 in. I.D. was filled as for the first section in Example 3; no silicone DC-550 solution was added. The column was then conditioned by flushing it with 25 mls. of toluene under slight pressure, thereafter purging it with nitrogen until dry. It was then flushed with helium at a column temperature of 100° C. for about 13 days.

The column was used in a Hewlett-Packard Model No. 402 gas chromatograph. A sample of a mixture of $C_6$–$C_{10}$, $C_{12}$, $C_{14}$ and $C_{16}$ normal aliphatic hydrocarbons was injected at a port temperature of 200° C. A flame ionization detector was used. The column temperature was programmed at 40–120° C. at 5° C./min. The resulting chromatogram showed excellent separation of the elution peaks for all hydrocarbons.

EXAMPLE 5

This example illustrates the use of a column at 20° C.

A column was prepared similarly to that of Example 4. No liquid phase was added.

The column was used in a Hewlett-Packard Model No. 402 gas chromatograph. A mixture of $C_5$–$C_9$ normal aliphatic hydrocarbons was injected. The column temperature was 20° C. The resulting chromatogram showed excellent separation of the elution peaks for all hydrocarbons, with very little tailing. This chromatogram is depicted in FIG. 1, wherein 11, 12, 13, 14 and 15 represent pentane, hexane, heptane, octane and nonane, respectively.

EXAMPLE 6

This example illustrates a column filled with open-pore polyurethane in which DC-550 was incorporated prior to gelation.

A glass column 46 inches long x 1/8 in. diameter, U-shaped, was filled with a polyurethane containing 10% DC-550. The urethane formulation was prepared as follows: Solution A consisted of 27.1 grams of polyol LA-475 and 5.7 grams of DC-550 in about 140 grams of toluene; Solution B consisted of about 140 grams of toluene containing 30.3 grams of polyisocyanate (a crude MDI having a functionality of about 2.3 and an equivalent weight of about 132–135). The column was filled as in Example 1 and the solvent was removed.

The column was used in a Hewlett-Packard Model No. 402 gas chromatograph. A column temperature of 55–140° C. was programmed at 5°/min. A flame ionization detector was used at 200° C.

(A) Using a sample of a mixture of $C_6$–$C_9$ normal aliphatic hydrocarbons, a chromatogram was obtained in which separation and symmetry of peaks corresponding to individual hydrocarbons was excellent. This chromatogram is depicted in FIG. 2, wherein 21, 22, 23, and 24 represent hexane, heptane, octane, and nonane, respectively.

(B) Using a sample of a mixture of benzene, toluene, xylene and n-hexane, there was obtained a chromatogram having good separation and symmetry of peaks. This chromatogram is depicted in FIG. 3, wherein 31, 32, 33, and 34 represent hexane, benzene, toluene, and xylene, respectively.

EXAMPLE 7

This example illustrates a column filled with open-pore polyurethane prepared in carbon tetrachloride.

A glass column was prepared and used for gas chromatography as in Example 4 except that the toluene was replaced with carbon tetrachloride. No silicone DC-550 was used.

The resulting chromatogram showed slightly improved symmetry for the peaks over those obtained with polyurethane prepared in toluene.

EXAMPLE 8

This example illustrates a column used in a preparative gas chromatograph.

A glass column, 8 ft. long x 2.25 in. diameter, U-shaped, was filled with a polyurethane porous structure prepared from the following formulations: Solution A consisted of 619 grams of polyol LA-475 in about 4785 grams of carbon tetrachloride; Solution B consisted of 691 grams of polyisocyanate (a crude MDI having a functionality of about 2.5 and an equivalent weight of about 131) in about 4785 grams of carbon tetrachloride. Solutions A and B were cooled to 17–20° C., combined and the mixture stirred briefly until it reached 21° C., and then drawn into the column. The procedure of Example 1 of revolving the filled column on a turntable during gelation was followed. After as much solvent was expelled as possible with nitrogen, the remainder was eluted while heating the column, first at 110° C. for about 16 hours, then at 150° C. for 2 hours.

The column was coated with a liquid phase using 100 ml. of DC-550 dissolved in a liter of pentane. This solution was introduced on the surface of one leg of the column and drawn slowly through the column by applying vacuum to the other leg. Air was drawn through the column for several hours to remove pentane and finally the column was heated at 120° C. for four hours. The liquid phase loading was approximately 10% by weight.

The column was used in a Hewlett-Packard Model 775 preparative gas chromatograph. A 1 ml. sample of a mixture of $C_5$, $C_7$ and $C_9$ normal aliphatic hydrocarbons was injected at a port temperature of 240° C. A column temperature of 30–150° C. was used, with step programming. A thermal conductivity detector was used at 260° C. Helium was used as the eluant. The chromatogram showed complete separation, with symmetrical peaks for the components.

EXAMPLE 9

This example illustrates the separation of metal chelate compounds.

A chromatographic column, 106 cm. long x 1.0 mm. I.D., was filled as in Example 1 using a urethane formula as follows: Solution A consisted of 27.1 grams of polyol LA-475 in about 140 grams of carbon tetrachloride, together with 5.7 grams of DC-550 silicone oil; Solution B consisted of 30.3 grams of polyisocyanate (a crude MDI having a functionality of about 2.5 and an equivalent weight of about 131) in about 140 grams of carbon tetrachloride. Thus, the silicone oil liquid phase was incorporated in the polyurethane at a level of 10% by weight. The solvent was removed and the column was conditioned with a flow of helium for 3 days at 130° C.

The column was used in a Hewlett-Packard Model No. 402 gas chromatograph, using an electron capture detection.

A mixture of the trifluoroacetylacetonates of alumina, beryllium, chromium (III) and rhodium (III) (R. C. Fay and T. S. Piper, J. Am. Chem. Soc. 85, 500 (1963)) in benzene solution was injected into the column, which was maintained at 80° C. A chomatogram was obtained in which separation and symmetry of peaks corresponding to the individual metal trifluoroacetylacetones was excellent. This chromatogram is depicted in FIG. 4, wherein 41, 42, 43, and 44 represent the trifluoroacetylacetonates of beryllium, aluminum, chromium (III), and rhodium (III), respectively.

EXAMPLE 10

This example illustrates the preparation and use of a thin layer chromatographic medium.

The liquid precursor solution was made by mixing Solution A and Solution B. Solution A contained 3.0 grams of polyol LA-475 in 13.1 grams of toluene; Solution B contained 3.33 grams of crude MDI having a functionality of about 2.5 and an equivalent weight of about 131 (e.g. Mondur MR of Mobay Chemical Co.) in 13.1 grams of toluene.

Two glass plates separated by 1 mm. shims were supported horizontally in an aluminum foil container. The space between the plates was filled with the solution above. Gelation occurred in about 20 minutes. After the toluene had evaporated, in about a day at room temperature, one of the plates was removed. The desired product consisted of a layer of porous polyurethane structure adhering to a glass plate.

As an example of its utility, the thin layer chromatographic structure was used to separate a solution of crude camptothecin. Camptothecin is an α-hydroxy lactone, $C_{20}H_{16}N_2O_4$ (Wall, M. E., et al., J. Am. Chem. Soc. 88, 3888 (1966)), extracted from a Chinese tree *Camptotheca acuminata* (C & EN April 20, 1970, page 14).

The layered structure was spotted about 1 inch from one end with a drop of a propanol solution of crude camptothecin extract. The plate was immersed at that end in about 0.5 inch of a solvent containing benzene (16 parts by volume), acetone (4 parts) and methanol (0.5 part) and developed for about 2 hours. At the end of this time, inspection under ultraviolet light showed a strong fluorescence which was separated by about an inch from a crude residue remaining where the spot had been. This fluorescence was characteristic of a purified product.

EXAMPLE 11

This example illustrates a column used for liquid-liquid chromatography.

A straight glass column 45 cm. long x 4 mm. I.D. was filled with the polyurethane formulation of Example 1. After the column had stood quietly for about 2 hours, it was freed of liquid by a nitrogen purge, then flushed with benzene.

The column was wet with benzene and to it was added a mixture of metal derivatives of diketones dissolved in benzene and ethanol. The solution contained the heptafluorodimethyloctanedionates of copper, cobalt (II) and cobalt (III), derived from 1,1,1,2,2,3,3-heptafluoro-7,7-dimethyl,4,6-octanedione.

First, benzene was used as the carrier, whereupon a dark green band characteristic of the Co (III) derivative moved rapidly down the column. Then ethanol was added at the top of the column and the benzene-ethanol mixture carried a red band characteristic of the Co (II) derivative part way down the column. There was then left at the top of the column a blue-green band characteristic of the Cu (II) derivative. Thus, a separation of the three compounds resulted.

It is to be understood that although the invention has been described with specific reference to particular embodiments thereof, it is not to be so limited since changes and alterations therein may be made which are within the full intended scope of this invention.

What we claim is:

1. A method of providing a chromatographic column with an open-pore polyurethane structure as a chromatographic support comprising the steps of:
   (a) preparing separate solutions of polyurethane forming reactants in inert organic liquid diluents which are capable of forming a homogeneous mixture in which the polyurethane is substantially insoluble comprising:
      (1) a solution of a first inert organic liquid diluent and a mixture of polyaryl polyalkylene polyisocyanates having a functionality of about 2.1–3.5 and containing about 40–50% diisocyanate, the balance being tri-, tetra-, and pentaisocyanates, said polyisocyanates having the formula

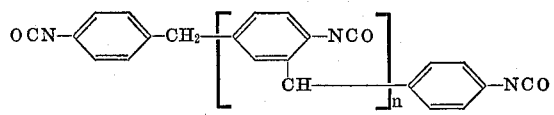

wherein $n$ has an average value of 0.5–2.0, and
      (2) a solution of a second inert organic liquid diluent and a polyol having a functionality of at least 3.0;
   (b) mixing solutions (1) and (2) and making a homogeneous liquid mixture of the reactants having a total concentration by weight of 10–30% and an NCO/OH ratio of 0.90–1.05 and ceasing said mixing before the onset of gelation;
   (c) transferring the homeogeneous liquid mixture to the empty chromatographic column so as to fill it before the onset of gelation;
   (d) maintaining the contents of the column in a quiescent state while gelation occurs and the open-pore polyurethane structure is formed; and
   (e) thereafter removing the inert organic liquid diluents.

2. A method of claim 1 in which there is present in the homogeneous liquid mixture of reactants a material capable of functioning as a stationary liquid phase in the filled chromatographic column.

3. A method of claim 1 in which there is inserted between steps (d) and (e) the steps of:
   (d') flushing the open-pore polyurethane structure with an inert organic liquid diluent within about four hours after gelation has substantially ceased.

4. A method of providing a chromatographic column with an open-pore polyurethane structure as a chromatographic support comprising steps (a) and (b) of claim 1 together with the steps of:
   (c) transferring the homogeneous mixture to the empty chromatographic column so as to fill it completely and displace all gases, before the onset of gelation,
   (d) closing the column with closing means so as to confine the mixture of reactants within the column;
   (e) rotating the column in the direction of at least one of its axes until gelation has substantially ceased; and
   (f) thereafter removing the inert organic liquid diluents.

5. A method of claim 4 in which there in inserted between steps (e) and (f) the step of:
   (e') flushing the open-pore polyurethane structure with an inert organic liquid diluent within about four hours after gelation has substantially ceased.

6. In a chromatographic column, the improvement comprising a chromatographic support comprising an open-pore polyurethane structure filling the column wall-to-wall having a porosity of at least 50%, and comprising coherent spherical particles of less than 10 microns diameter separated by interconnected interstices, wherein the polyurethane is the reaction product of (1) a mixture of polyaryl polyalkylene polyisocyanates having the formula

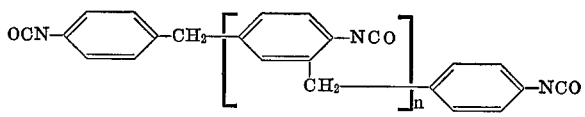

wherein $n$ has an average value of 0.5–2.0, containing about 40–50 percent diisocyanate, the balance being tri, tetra- and pentaisocyanates, having a functionality of about 2.1–3.5, and (2) a polyol having a functionability of at least 3.0.

7. A chromatographic column of claim 6 wherein the chromatographic support is coated with a liquid stationary phase.

8. A chromatographic column of claim 7 wherein the liquid stationary phase is a silicone oil having a maximum volatility of 3 percent after 4 hours at 250° C.

9. A thin-layer chromatographic plate consisting of a supporting first layer with a planar surface, and an adhering second layer comprising an open-pore polyurethane structure having a porosity of at least 50% and comprising coherent spherical particles of less than 10 microns diameter separated by interconnected interstices, wherein the polyurethane is the reaction product of (1) a mixture of polyaryl polyalkylene polyisocyanates having the formula

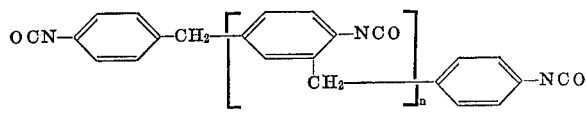

wherein $n$ has an average value of 0.5–2.0, containing about 40–50 percent diisocyanate, the balance being tri-, tetra- and pentaisocyanates, having a functionality of about 2.1–3.5, and (2) a polyol having a functionality of at least 3.0.

10. In a method of separating a mixture of organic compounds, comprising flowing the mixture through a chromatographic column, the improvement in which the column is packed with an open-pore polyurethane structure filling the column wall-to-wall, having a porosity of at least 50%, and comprising coherent spherical particles of less than 10 microns diameter separated by interconnected interstices, wherein the polyurethane is the reaction product of (1) a mixture of polyaryl polyalkylene polyisocyanates having the formula

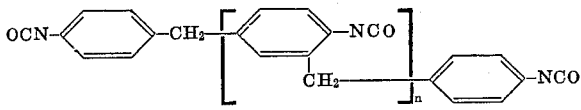

wherein $n$ has an average value of 0.5–2.0, containing about 40–50 percent diisocyanate, the balance being tri-, tetra- and pentaisocyanates, having a functionality of about 2.1–3.5, and (2) a polyol having a functionality of at least 3.0.

11. A method of claim 10 wherein the organic compounds are metal derivatives of diketones wherein the metal is aluminum, beryllium, chromium or rhodium.

12. A method of claim 10 wherein the surface of the support is coated with a liquid stationary phase.

13. A method of claim 12 wherein the liquid stationary phase is a silicone oil having a maximum volatility of 3 percent after 4 hours at 250° C.

References Cited

UNITED STATES PATENTS 3,347,020  10/1967  Van Venrooy _____ 55—386X
3,407,573  10/1968  Crowley _____ 55—386

J. L. DE CESARE, Primary Examiner

U.S. Cl. X.R.

210—198; 55—67

PO-1050
(5/69)

UNITED STATES PATENT OFFICE
CERTIFICATE OF CORRECTION

Patent No. 3,580,843                Dated May 25, 1971

Inventor(s) Ival O. Salyer, Robert T. Jefferson & William D. Ross

It is certified that error appears in the above-identified patent and that said Letters Patent are hereby corrected as shown below:

Column 2, line 28, change "polyisocpa-" to --- polyisocya- ---. Column 4, line 3, change "42" to --- 43 --- and line 50, change "charging" to --- changing ---. Column 6, line 23, change "20&" to --- 20% --- and line 75, change "10/" to --- 10% ---. Column 10, line 7 change "CH" to --- $CH_2$ --- and line 49, change "in" to --- is ---.

Signed and sealed this 26th day of December 1972.

(SEAL)
Attest:

EDWARD M. FLETCHER, JR.                ROBERT GOTTSCHALK
Attesting Officer                          Commissioner of Patents